United States Patent [19]
Smith et al.

[11] Patent Number: 6,002,501
[45] Date of Patent: Dec. 14, 1999

[54] METHOD AND APPARATUS FOR ACTIVE TAMPER INDICATING DEVICE USING OPTICAL TIME-DOMAIN REFLECTOMETRY

[75] Inventors: D. Barton Smith, Oak Ridge; Jeffrey D. Muhs, Lenoir City; Chris A. Pickett, Clinton, all of Tenn.; D. Duncan Earl, Knoxville, Tex.

[73] Assignee: Lockheed Martin Energy Research Corp., Oak Ridge, Tenn.

[21] Appl. No.: 08/885,972

[22] Filed: Jun. 30, 1997

[51] Int. Cl.[6] ........................... H04B 10/08; H04B 10/12; G01N 21/00; G01J 5/48
[52] U.S. Cl. ...................... 359/110; 359/110; 359/173; 359/154; 356/73.1; 356/44
[58] Field of Search .................. 356/73.1; 359/154, 359/110, 173

[56] References Cited

U.S. PATENT DOCUMENTS

| | | | |
|---|---|---|---|
| 4,095,872 | 6/1978 | Stieff et al. | 350/96.24 |
| 4,106,849 | 8/1978 | Stieff . | |
| 4,130,341 | 12/1978 | Stieff . | |
| 4,161,348 | 7/1979 | Ulrich . | |
| 4,297,684 | 10/1981 | Butter . | |
| 4,367,460 | 1/1983 | Hodara . | |
| 4,447,123 | 5/1984 | Page et al. . | |
| 4,729,626 | 3/1988 | Stieff . | |
| 5,384,885 | 1/1995 | Diner | 385/140 |
| 5,500,731 | 3/1996 | Sato et al. | 356/73.1 |
| 5,546,483 | 8/1996 | Inoue et al. | 385/14 |
| 5,708,500 | 1/1998 | Anderson | 356/73.1 |
| 5,745,437 | 4/1998 | Wachter et al. | 367/100 |
| 5,764,348 | 6/1998 | Bloom | 356/73.1 |
| 5,790,285 | 8/1998 | Mock | 359/110 |

OTHER PUBLICATIONS

Barton Smith and Jeffrey Muhs, "OTDR_Based Fiber Optic Seal Monitor for Material Control and Security," INMM Central Region Chapter Meeting, Lexington, Kentucky, Oct. 28, 1994, 2 pages.

D. Barton Smith and Chris A. Pickett, "OTDR–Based Active Seal Systems for Material Control and Accountability," 1995, 1 page.

D.B. Smith, T.V. Smith, J.D. Muhs, 36th Annual Meeting, Institute for Nuclear Materials Management, (INMM), p. 47, "OTDR–Based Active Seals for Material control and Accountability," and abstract OTDR–Based Active Seals for Physical Security of Storage Containers, Jul. 9–12, 1995.

*Primary Examiner*—Jason Chan
*Assistant Examiner*—Mohammad Sedighian
*Attorney, Agent, or Firm*—Jones & Askew, LLP

[57] ABSTRACT

An optical time-domain reflectometer (OTDR) launches pulses of light into a link or a system of multiplexed links and records the waveform of pulses reflected by the seals in the link(s). If a seal is opened, the link of cables will become a discontinuous transmitter of the light pulses and the OTDR can immediately detect that a seal has been opened. By analyzing the waveform, the OTDR can also quickly determine which seal(s) were opened. In this way the invention functions as a system of active seals. The invention is intended for applications that require long-term surveillance of a large number of closures. It provides immediate tamper detection, allows for periodic access to secured closures, and can be configured for many different distributions of closures. It can monitor closures in indoor and outdoor locations and it can monitor containers or groups of containers located many kilometers apart.

20 Claims, 5 Drawing Sheets

METHOD AND APPARATUS FOR ACTIVE TAMPER INDICATING DEVICE USING OPTICAL TIME-DOMAIN REFLECTOMETRY

STATEMENT AS TO RIGHTS TO INVENTIONS MADE UNDER FEDERALLY-SPONSORED RESEARCH AND DEVELOPMENT

This invention was made with United States government support awarded by the United States Department of Energy under contract to Lockheed Martin Energy Research Corporation. The United States has certain rights in this invention.

BACKGROUND OF THE INVENTION

1. Field of the Invention

The present invention relates generally to the field of security seal monitoring. More particularly, the present invention relates to time-domain reflectometry monitoring of security seals. Specifically, a preferred implementation of the present invention includes the use of fiber optic loops that are equipped with independent transmitters/receivers so as to permit the near real-time monitoring of a large number of security seals distributed among a plurality of such loops with a single time-domain reflectometer, thereby obviating the need for visual inspection of the seals. The present invention thus relates to a seal monitoring system of the type that can be termed active.

2. Discussion of the Related Art

Historically, the Department of Energy (DOE) has been responsible for the long-term storage and protection of large quantities of Special Nuclear Material (SNM). SNM is stored in individual containers located in vaults. Security measures and inventory cycles are the means by which DOE ensures that SNM remains within the containers where it is stored and verifies that it is not disturbed in any manner.

One method for monitoring the storage of SNM within the containers is to affix tamper-indicating devices (TID's) to the container closures. These TID's are typically mechanical devices such as wire cables that are looped through the closures in such a way that they are destroyed in a most visible manner when the closures are opened. Although these TID's do not provide physical security per se, they are an indispensable aid to material accountability and inventory.

To verify the integrity of a TID, it is usually necessary to have persons visually inspect and physically test the TID. In this regard the TID can be considered a passive seal because the TID itself cannot alert an alarm system when it has been breached. The discovery of a breached seal does not necessarily reveal when the breach occurred, since the breach could have occurred anytime between inspections. Furthermore, because passive seals must be visually inspected, verification of the seals is a labor-intensive endeavor that often requires exposure of personnel to radiation hazards. Therefore, what is needed is a system that actively monitors seals.

One unsatisfactory previously recognized approach, in an attempt to solve the above-discussed problems involves incorporating all the seals in a given area of a storage facility into an active monitoring circuit. However, a disadvantage of this previously recognized approach is that when such a circuit is broken, it is not possible to know exactly which container in the alarmed area has been opened. Therefore, what is also needed is a solution that can actively indicate exactly which seal(s) in an area have been breached.

To address the above-discussed disadvantage, another unsatisfactory previously recognized approach involves fitting each of the seals in a storage facility with a separate active circuit. However, a disadvantage of this previously recognized approach is complexity, especially where there are large number of seals to be monitored. Further, this previously recognized approach is costly. Therefore, what is also needed is a solution that meets the above-discussed requirements in a simple and more cost effective manner.

The typical use of an optical time-domain reflectometer (OTDR) is to determine the location of a discontinuity or a large transmission loss, such as that imposed by a faulty component, in an optical fiber. An OTDR can discriminate against small losses such as those caused by satisfactory components. An OTDR can typically find faults in optical fibers at fiber distances of many kilometers from the OTDR. The detection distance is limited primarily by the attenuation loss intrinsic to the fiber, the number of components inserted in the fiber, and the dynamic range of the OTDR. Similarly, the spatial resolution of an OTDR can be as coarse as several meters or as precise as a fraction of a centimeter. The spatial resolution is limited primarily by the duration of the optical pulse generated by the OTDR and the temporal resolution of the photodetector and its associated electronics.

An OTDR provides an excellent means of establishing a system of active seals. Basically, if an optical fiber connector is present at an arbitrary point along an optical fiber as a seal or tamper indicating device, then the OTDR can determine whether the seal (connector) is secure (closed) or breached (open). The OTDR can uniquely identify any one of tens, hundreds or thousands of such seals along an optical fiber because the temporal position of the Fresnel reflection from the seal (connector) and present on the waveform generated by the OTDR electronics has a one-to-one correspondence with the spatial position of the seal along the optical fiber. This system functions as an active seal system because the OTDR can remotely, immediately and automatically detect that a seal has been breached.

An improvement on the idea of a series of seals on a single optical fiber cable is to introduce a 1-by-n switch after the OTDR. This switch provides a means for implementing multiple optical fiber cables, each with series of seals. In the vocabulary of OTDR technology, a connector or other entity that causes a Fresnel reflection or other transmission loss is referred to as a "feature." A series of optical fiber cables that are joined by connectors (and that therefore contain features) are referred to as a "link." A system of links that can be accessed by the OTDR by a switch or other means of multiplexing is referred to as a "system."

The OTDR system described above suffers from two significant limitations. First, the disconnection of a seal in link disables the ability of the OTDR to monitor seals beyond the disconnected seal since the light pulse is terminated by the open seal. Second, in a multiplexed system the OTDR can monitor only one link at a time, thereby eliminating the ability of the OTDR to immediately detect any breached seal in a non-monitored link.

The below-referenced U.S. Patents disclose embodiments that were satisfactory for the purposes for which they were intended. U.S. Pat. No. 4,095,872, to Stieff et al., entitled "Security sealing system using fiber optics," was issued Jun. 20, 1978. U.S. Pat. No. 4,106,849 to Stieff, entitled "Fiber optic seal," was issued Aug. 15, 1978. U.S. Pat. No. 4,130, 341 to Stieff, entitled "Fiber optic seal apparatus," was issued Dec. 19, 1978. U.S. Pat. No 4,161,348 to Ulrich, entitled "Preassembled fiber optic security seal," was issued Jul. 17, 1979. U.S. Pat. No. 4,297,684 to Butter, entitled "Fiber optic intruder alarm system," was issued Oct. 27, 1981. U.S. Pat. No. 4,367,460 to Hodara, entitled "Intrusion sensor using optic fiber," was issued Jan. 4, 1983. U.S. Pat. No. 4,447,123 to Page et al., entitled "Fiber optic security system including a fiber optic seal and an electronic verifier," was issued May 8, 1984. U.S. Pat. No. 4,729,626 to Stieff, entitled "Self-locking fiber optic seal," was issued Mar. 8, 1988. The entire contents of all the above-referenced U.S. Patents are hereby expressly incorporated by reference into the present application.

Within this application several publications are referenced by superscripts composed of Arabic numerals within parentheses. Full citations for these, and other, publications may be found at the end of the specification immediately preceding the claims. The disclosures of all these publications in their entireties are hereby expressly incorporated by reference into the present application for the purposes of indicating the background of the present invention and illustrating the state of the art.

SUMMARY OF THE INVENTION

Therefore, there is a particular need for an OTDR where the disconnection of a seal in a link does not disable the ability of the OTDR to monitor seals beyond the disconnected seal since the light pulse is terminated by the open seal. There is also a need for a multiplexed OTDR system that can monitor more than one link at a time, so as to maintain the ability to immediately detect any breached seal. By forming the link into a loop, the pulses of light can be directed to any particular seal in the circuit along at least two alternative routes, thereby enhancing the reliability of the system. Further, by providing each of a plurality of such loops with an independent transmitter/receiver subassembly, a single OTDR can be time division multiplexed to service a large number of loops while still providing a near real-time active alarm function. Furthermore, the seals can be fabricated so as to minimize the possibility of opening a container without breaking the loop. Thus, it is rendered possible to simultaneously satisfy the above-discussed requirements of active monitoring of a large number of individual seals which, in the case of the prior art, are mutually contradicting and cannot be simultaneously satisfied.

These, and other, aspects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the components and operation of model systems provided with the present invention, will become more readily apparent by referring to the exemplary, and therefore nonlimiting, embodiments illustrated in the drawings accompanying and forming a part of this specification, wherein like reference numerals designate the same elements in the several views. It should be noted that the features illustrated in the drawings are not necessarily drawn to scale.

DESCRIPTION OF PREFERRED EMBODIMENTS

Figure 1:
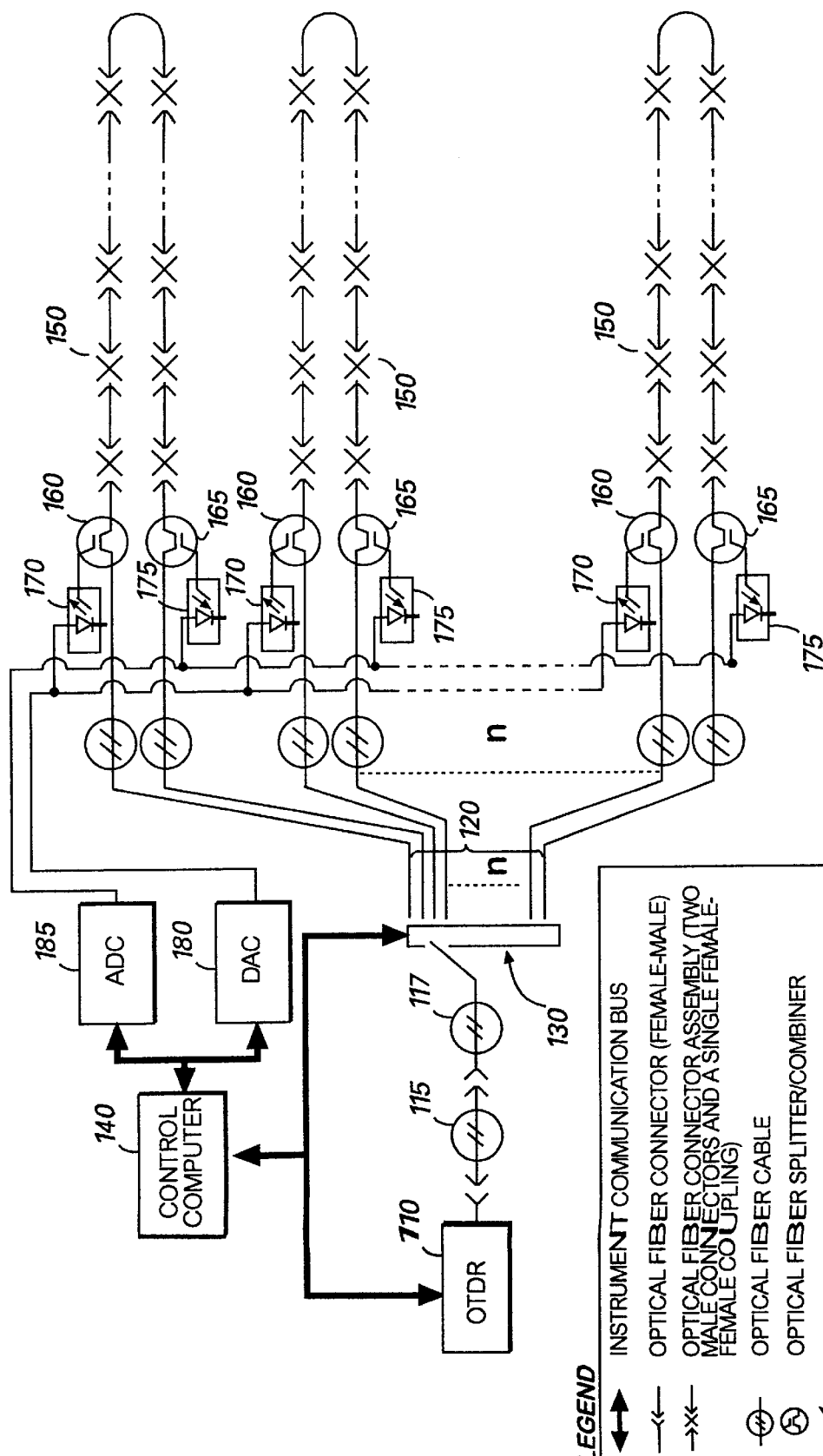
FIG. 1 illustrates a block level schematic view of an optical time-domain based fiber optic seals system, representing an embodiment of the present invention.

The present invention and the various features and advantageous details thereof are explained more fully with reference to the nonlimiting embodiments that are illustrated in the accompanying drawings and detailed in the following description. Descriptions of well known components and processing techniques are omitted so as to not unnecessarily obscure the present invention in detail.

1. System Overview

The ability to continue monitoring seals in a link even after one is broken is achieved by arranging the multiplexed links in a continuous loop configuration. The ends of the loop are connected to two ports on a 1-by-n switch. In this arrangement the OTDR can send pulses of light in both directions through the loop. If a seal in that loop is opened, the OTDR can continue to monitor the integrity of the other unbreached seals on the loop by sending pulses in one end of the loop and then the other end of the loop.

The ability to monitor more than one link is achieved by adding a few additional optical components to the system. Since a single OTDR can interrogate only one link at a time, there must be a means of immediately determining a breach in any arbitrary link. This is accomplished by integrating a transmitter and detector set into each link. A transmitter, such as a light-emitting diode (LED), is spliced into the link at the beginning of one end of the loop, and a detector, such as a photodiode (PD), is spliced into the link at the beginning of the opposite end of the loop. When the control computer switches on the transmitter, the detector will detect the transmission of the transmitter's light through the link and will communicate a signal to the control computer that indicates the presence of this light. If a connector is breached, the transmission of light through the link will be instantaneously diminished or terminated, and the detector will communicate a signal to the control computer that indicates that such an event has occurred. The control computer will then immediately cause the OTDR and switch to interrogate the suspect link to determine which connector(s) has (have) been breached.

The use of a randomly pulsed and/or a frequency modulated output in the link will provide enhanced security over a continuous output. It would be much more difficult for a person to defeat the continuous detection capability provided by the transmitter and the detector when the system uses a randomly pulsed and/or frequency modulated LED transmitter. The computer controls the modulation of the LED, then verifies that the detector is receiving the selected random pulse or frequency of light from the LED transmitter. A difference between the transmitted frequency and the detected frequency indicates tampering. This method will function reliably regardless of variations in the attenuation of the fiber optic link attributable to increased or decreased cable length or the addition or removal of connectors. Furthermore, this is an improvement over a static intensity transmitter system where a threshold limit for detection must be selected each time a connector or cable is added or removed.

2. Detailed Description of Preferred Embodiments

FIG. 1 shows a schematic of the invention apparatus. An optical time-domain reflectometer (OTDR) 110 is optically coupled to a plurality of loops 120. There can be n number of loops 120. Each of the loops 120 can include one or more fiber cables (single-mode or multi-mode fiber encased in a protective jacket with connectors at both ends). However, each of the loops 120 can include a plurality of optical fibers. The reflectometer 110 is coupled to the loops 120 via optical fiber cables 115 and 117 and an optical fiber multiplexer 130. The multiplexer 130 can be termed a 1×n switch or a matrix router.

The reflectometer 110 and the switch 130 are both connected to a control computer 140 via an interface bus. Each of the loops 120 includes a plurality of optical fiber connector assemblies 150. Each of the loops can be connected to the switch 130 with optical fiber connectors (e.g., male-female). Each of the loops 120 also includes a combiner 160 and a beamsplitter 165. The combiner 160 is connected to a transmitter 170. The transmitter 170 is connected to the control computer 140 via a digital to analog converter 180. The beam splitter 165 is connected to a receiver 175. The receiver is connected to the control computer 140 via an analog to digital converter 185. All of these connections can be bi-directional.

The optical time-domain reflectometer (OTDR) launches optical pulses, generated by an optical transmitter (not shown), into a first end of one of the loops 120 to generate an optical return signal. The switch 130 operates to choose the loop. The return signal includes an exponentially decreasing Rayleigh backscater signal and Fresnel reflections from any mechanical splices, connectors (or breaks) in the loop.

The Fresnel reflection at a seal break is significantly larger in amplitude than a reflection from an intact seal (or a splice or connector). Significantly, the temporal position of the Fresnel reflection corresponds to the spatial position of the feature along the optical fiber that causes the reflection. In this way, the individual integrity of all the seals on the loop can be constantly verified remotely and without direct human intervention.

The return optical signal is coupled to an optical receiver in the reflectometer (also not shown) having a photodetector, that converts the optical signal into an electrical signal. The analog electrical signal is converted to digital values by an analog-to-digital converter, processed by a controller, and displayed as a waveform.

Figure 2:
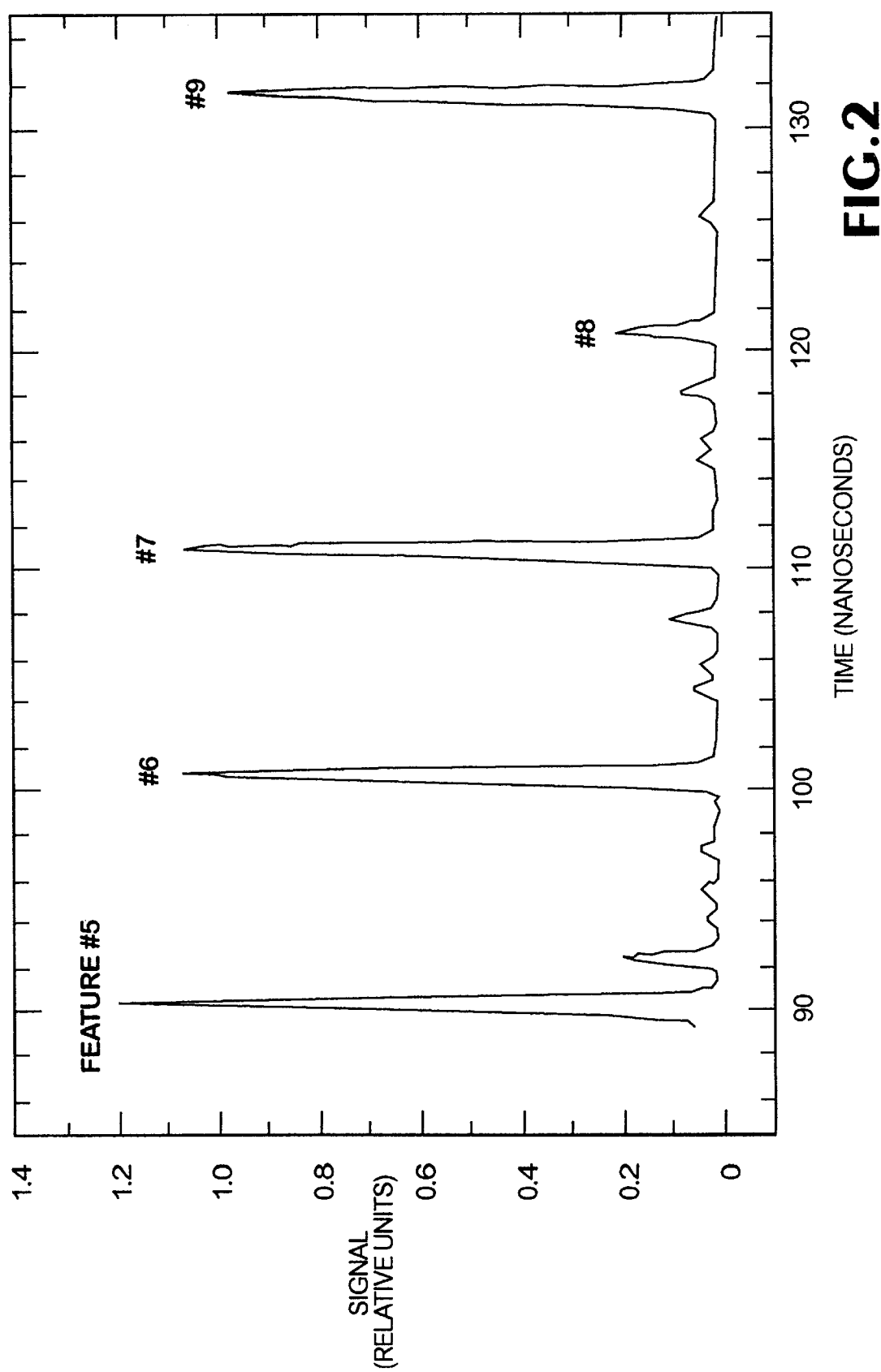
FIG. 2 illustrates detected signal intensity as a function of time representing reflection from several connectors, representing an embodiment of the present invention.

FIG. 2 shows an OTDR-generated waveform that corresponds to the Fresnel reflections from a series of connectors. It can be appreciated that the temporal positions of the peaks correspond to the spatial positions of the features.

It can also be appreciated that there is considerable variation in the magnitudes of the reflections from different connectors. Furthermore, a particular connector can produce a measurably different reflection magnitude when disconnected and then reconnected. This variation would make it difficult or impossible to disconnect a seal (or seals) and then replace them with substitute seals without the system detecting the activity. The OTDR can measure the resulting difference in reflected signal magnitude. In addition, the OTDR can detect the change in length that could occur due to the use of a substitute cable.

Figure 3:
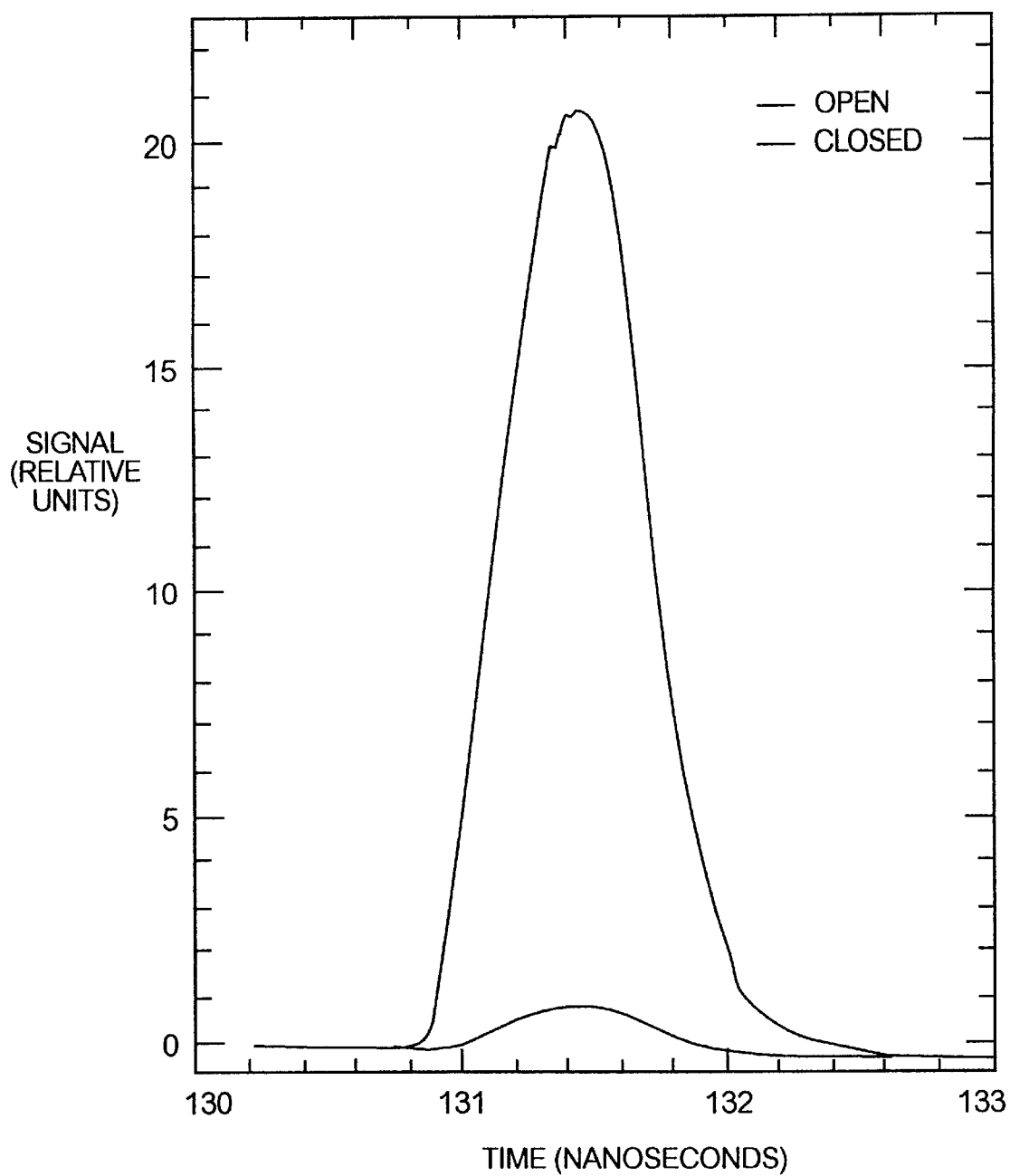
FIG. 3 illustrates detected signal intensity as a function of time for the reflection from a connector in an open state (high amplitude peak) and a closed state (lower amplitude signal), representing an embodiment of the present invention.

FIG. 3 shows a comparison between the reflected signals from closed and opened connectors. The magnitude of the reflection from a splice or connector is typically less than two (2) percent of the incident signal. The magnitude of the reflection from a break in an optical fiber or the end of a fiber is typically four (4) percent or more.

To implement the optical fiber connector as a seal, it is necessary to integrate the connector into the closure on a container. This can be readily accomplished. For instance, the optical fiber cables can be looped through a conduit in a security bolt and then connected. In general, the optical fiber connector can be implemented as a seal in any instance where a lock or passive seal is used.

Figure 4:
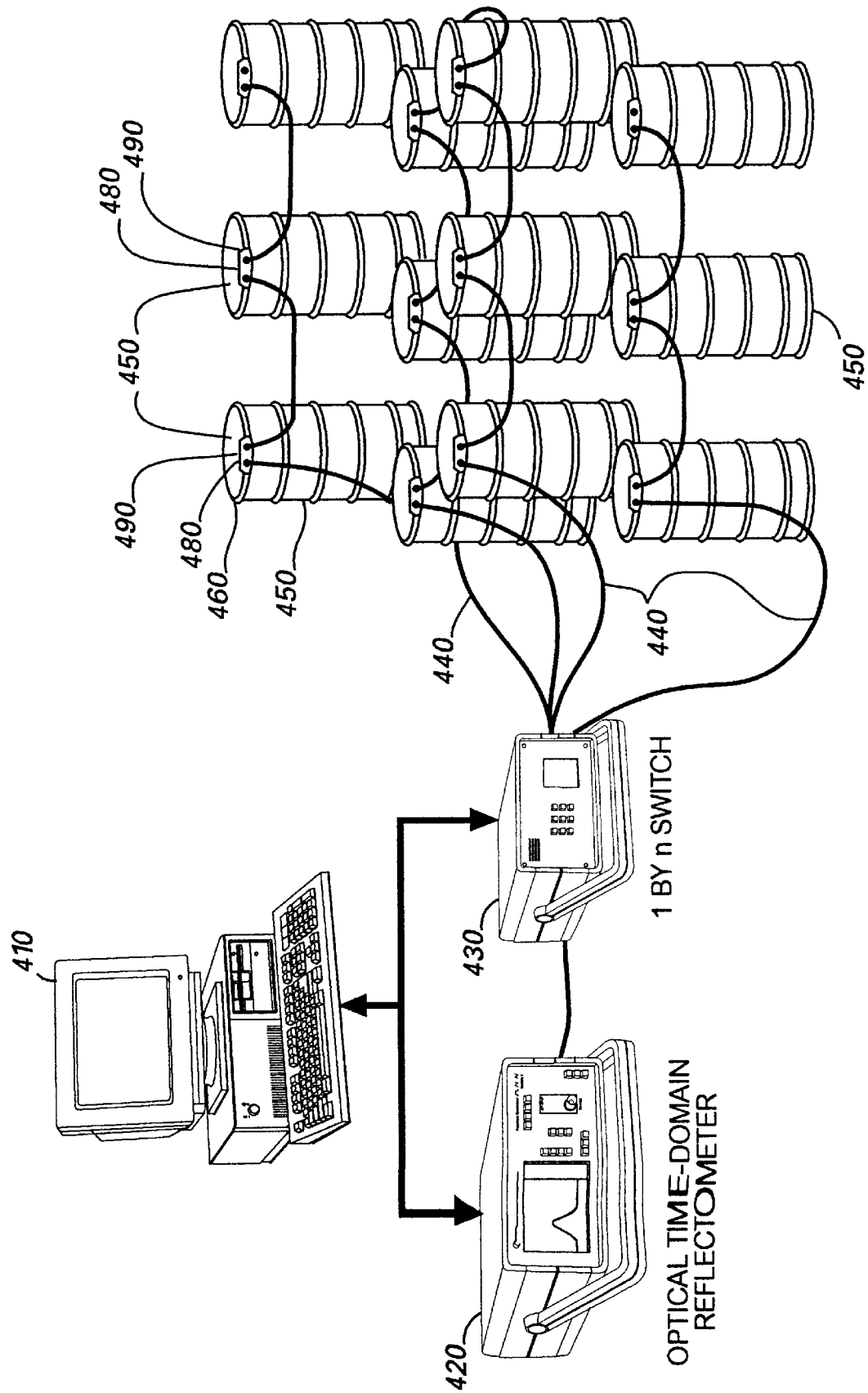
FIG. 4 illustrates a high level schematic view of an OTDR-based active seals system implemented on an array of storage drums, representing an embodiment of the present invention.

FIG. 4 shows OTDR-based active seals implemented on an array of storage drums. A personal computer 410 is connected to an optical time-domain reflectometer 420 and a 1 by n switch 430. A plurality of fiber-optic cables 440 lead away from the switch 430 toward several groups of storage drums 450. Each of the drums 450 includes a lid ring 460 that is held in place with a bolt assembly 480. The bolt assembly 480 includes a fiber-optic seal 490.

This integration of the connector into the bolt makes it impossible to rotate the bolt without first disconnecting the cables. An improvement to this idea is to attach a fixture to the bolt that further restricts the rotation of the bolt.

Figure 5:
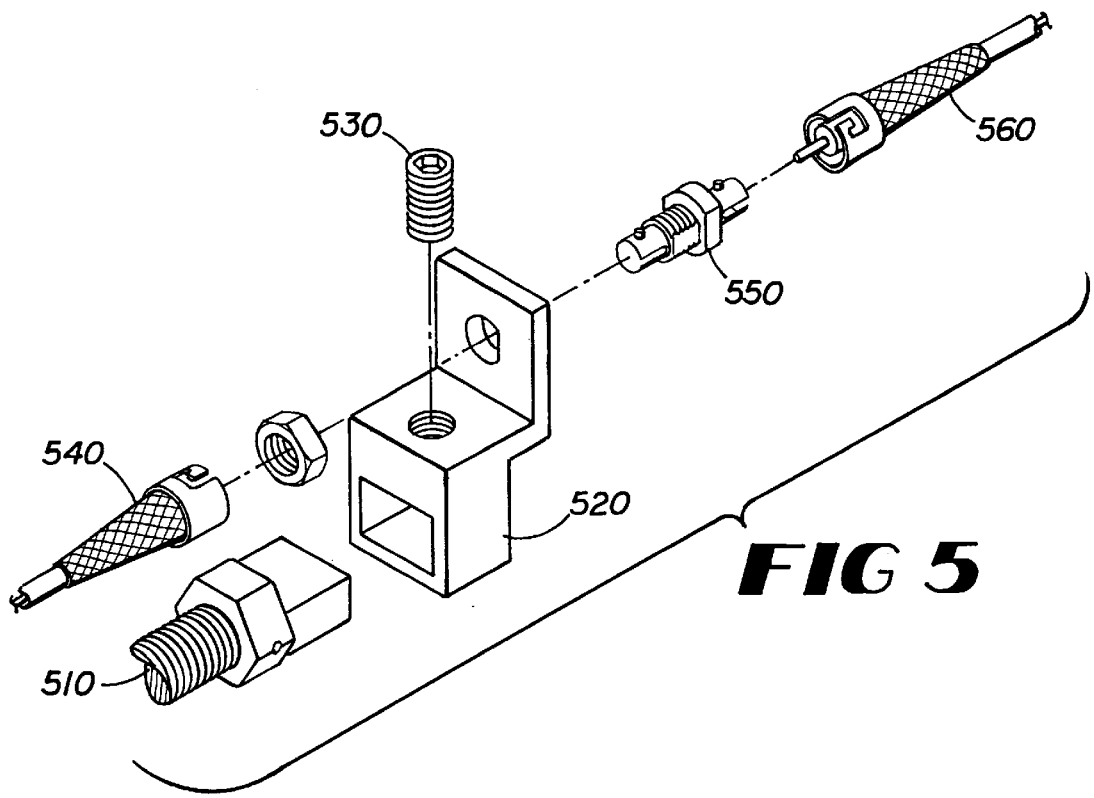
FIG. 5 illustrates an exploded perspective view of an optical-mechanical seal, representing an embodiment of the present invention.

FIG. 5 shows a fixture that attaches to a lid ring bolt 510 for the purpose of preventing it from being rotated. The fixture include the bolt 510, a fixture body 520, a fixture bolt 530, a first fiber optic cable 540, a female—female coupling 550, and a second fiber optic cable 560. An acetate film (not shown) can be located between cables 540 and 560. Such a film can have an orientation and will fall apart upon disassembly of the connection. The optical fiber cables and connector are then looped through this fixture to provide a seal that verifies the closure of the fixture.

Figure 6:
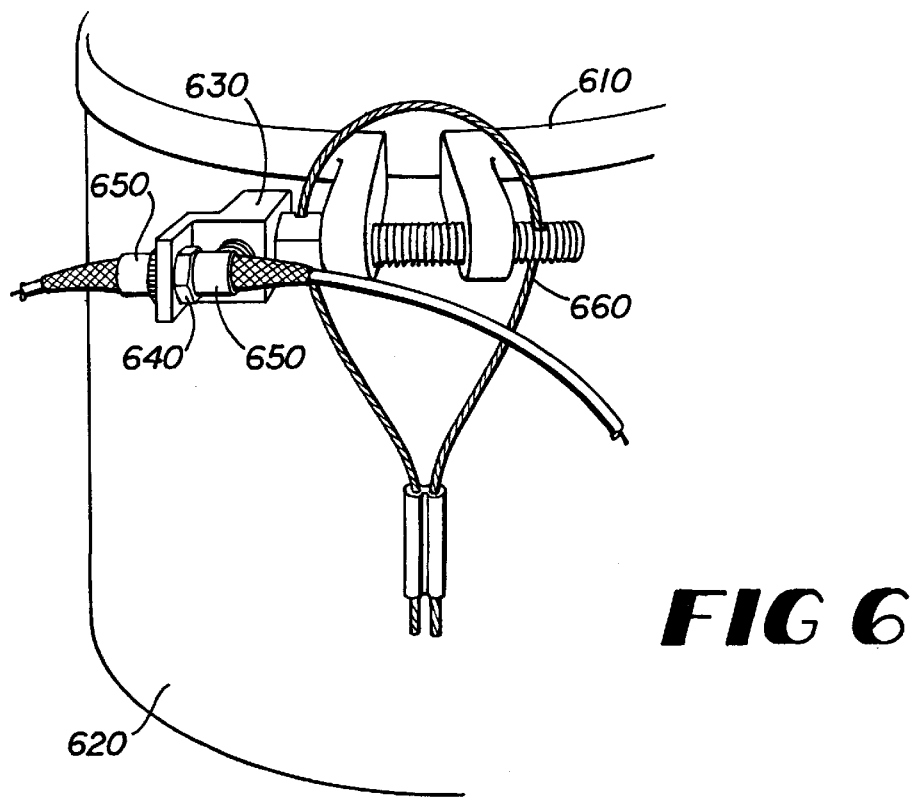
FIG. 6 illustrates a perspective view of an optical-mechanical seal installed on a drum lid, representing an embodiment of the present invention.

FIG. 6 shows a fixture attached to a lid ring 610 of a storage drum 620. The fixture includes a bolt-to-seal adapter 630, a coupler affixed to the adapter 640, and two fiber optic connectors 650. The drum also includes a passive TID 660.

An alternative version of this invention would replace the optical components with electrical components. For instance, the optical time-domain reflectometer would be replaced with a time-domain reflectometer (TDR), the optical fibers would be replaced with coaxial cables or twisted-pair wires, and the optical fiber connectors would be replaced with signal attenuators. The operation of this system would be analogous to the optical system. The TDR would launch pulses of electrical energy into the cables and would measure the reflected energy.

The particular process used for assembling the loops of the system should be inexpensive and reproducible. Conveniently, the assembly of the loops can be carried out using any optical fiber joining method. It is preferred that the process be capable of producing junctions with relatively low Fresnel reflectivity.

However, the particular manufacturing process used for assembling the loops is not essential to the present invention as long as it provides the described capabilities. Normally the makers of the invention will select the assembly process based upon tooling and energy requirements, in view of the expected application requirements of the final product and the demands of the overall system integration process.

Practical Applications of the Invention

A practical application of the present invention that has value within the technological arts is material accountability at DOE sites where Special Nuclear Material is stored. Further, the present invention is useful in conjunction with seals such as are used for the purpose of ensuring chemical and/or biological agent accountability, or for the purpose of ensuring that sensitive data storage media or other valuable are not accessible, or the like. There are virtually innumerable uses for the present invention, all of which need not be detailed here.

Advantages of the Invention

A security seal system representing an embodiment of the invention is cost effective and advantageous compared to passive seal technologies for at least the following reasons. The invention provides real-time surveillance of container closure integrity. The connectors can be resealed, and therefore, reused many times. The invention saves labor and costs associated with visually inspecting the seals. The invention reduces the exposure of workers to radiation hazards. The invention can immediately record the breach of any seal in the system.

Compared to electrical or hybrid electrical/optical active seal systems, a security seal system representing an embodiment of the invention is cost effective and advantageous for at least the following reasons. All the seals and all cabling of the invention are immune to electromagnetic interference. Embodiments of the invention can be built from off-the-shelf components. Embodiments of the invention can survey thousands of seals. Embodiments of the system can be easily reconfigured to accommodate any number of seals in several locations; even those separated by many kilometers. No special training is required to install embodiments of the invention. Portions of an embodiment of the invention can be deactivated for maintenance or reconfiguration.

Compared to existing optical active seal systems, a security seal system representing an embodiment of the invention is cost effective and advantageous for at least the following reasons. Embodiments of the invention are more robust due to the redundancy provided by the loop configuration. Embodiments of the invention can provide quick data on many loops using just a single time-domain reflectometer by providing each of the loops with an independent transmitter/receiver subsystem. Embodiments of the invention can provide economical confirmation of container closure with the optical-mechanical seal. Furthermore, the optical-mechanical seal can be integrated into the closure device of any type of storage container.

The invention can monitor the authorized addition or removal of a seal in the system. An authorized user can notify the computer that a seal will be added to or removed from a secured link, then the computer can verify that the seal is added or removed from the proper location in the secured link.

The invention can confirm the proper addition, removal, and setup of fiber optic links and seals. For instance, when a seal is added to a link, the OTDR can be used to map the spatial location and reflection of the seal. If the OTDR does not find a reflection at the expected location of a given seal, then the system can report that the seal was not properly applied. If the seal does have a measurable reflection, then the quality of the seal connection can be assessed, that is, a small reflection indicates a good seal, a large reflection indicates a bad seal.

When the system is powered by an uninterruptable power supply (UPS), the computer can be programmed to make a map of the entire seal system immediately following a main power failure. During the interval that the UPS continues to supply power to the system, the computer will control the OTDR and multiplexer to make a precise measurement of the spatial location and intensity of the reflection at each seal and record these measurements as a map of the attributes of the system. If the main power is not restored before the UPS power is drained, then the System will go into a power-off standby procedure during which it cannot detect a breach of any seal. However, upon the restoration of power the system will again perform a precise measurement of the spatial location and intensity of the reflection at each seal. This map will then be compared to the map made before the standby. When a seal is disconnected and then reconnected, slight random variations in the alignment of the optical fibers occur. These slight random variations are easily measurable by the OTDR. Thus, a significant difference between the pre- and post-standby reflection or location of a seal will identify that the seal was breached during the power-off interval.

The system provides a high degree of false-alarm discrimination. Because the system uses two methods for detecting seal breaches, the receiver/detector method and the OTDR method, this redundancy provides independent verification of an alarm condition. If a breach is detected by both methods, then the system indicates that it has confirmed a breach. If only one method detects a breach, then the system can perform a more rigorous verification procedure to determine the cause of the alarm condition. In this manner the system is less likely to produce false alarms.

All the disclosed embodiments of the invention described herein can be realized and practiced without undue experimentation. Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the time-domain reflectometry based seal system described herein is a physically separate module; it will be manifest that the system may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It is intended that the appended claims cover all such additions, modifications and rearrangements. Expedient embodiments of the present invention are differentiated by the appended subclaims.

REFERENCES

1. Marks Mechanical Engineering Handbook, 10th ed., McGraw Hill, (Eugene A. Avallone et al. eds., 1996).
2. The Electrical Engineering Handbook, CRC Press, (Richard C. Dorf et al. eds., 1993).
3. Handbook of Optics, Volumes I–II, 2nd ed., McGraw Hill Inc., (Michael Bass et al. eds., 1995).

What is claimed is:

1. A tamper indicating device, comprising:
   a plurality of fiber optic loops, each loop optically connecting a plurality of connector assemblies within the loop;
   a control computer functionally connected to the loops and, for each loop, operative to detect a breach in the loop by comparing representations of optical signals injected into the loop to representations of return signals received from the loop;
   an optical time-domain reflectometer operative to generate optical breach-identification signals and to receive corresponding return breach-identification signals;
   a matrix router optically connected to the reflectometer and operative to selectively connect the reflectometer to each of the fiber optic loops, the matrix router functionally connected to the control computer, which is operative to cause the matrix router to switch the reflectometer into optical connection with a selected one of the fiber optic loops in response to detection of a breach in the selected loop; and
   the reflectometer is operative to interrogate the selected loop to identify a particular one of the connector assemblies associated with the breach by comparing breach-identification signals injected into the selected loop to corresponding return breach-identification signals.

2. The tamper indicating device of claim 1, wherein:
   each loop defines first and second ends;
   the matrix router selectively connects the reflectometer to each loop at its first and second ends; and
   the reflectometer is further operative to inject optical signals into both ends of the selected fiber optic loop to monitor the integrity of non-breached connector assemblies while the breach subsists in the selected fiber optic loop.

3. The tamper indicating device of claim 1, wherein:
   each loop comprises an optical transmitter for injecting breach-detection signals into a first end of the loop, and a receiver for detecting corresponding return breach-detection signals at a second end of the loop;
   for each fiber optic loop, the control computer is operative to generate trigger signals for causing the transmitter to inject the breach-detection signals into the first end of the loop, to receive indicator signals from the receiver in response to the breach-detection signals, and to detect a breach in the loop by comparing the trigger signals to the indicator signals; and
   the control computer is functionally connected to the transmitter and the receiver of each loop.

4. The tamper indicating device of claim 3, wherein:
   each transmitter comprises a light-emitting diode; and
   each receiver comprises a photodiode.

5. The tamper indicating device of claim 4, wherein the control computer is operative to randomly pulse the breach-detection signals.

6. The tamper indicating device of claim 4, wherein the control computer is operative to frequency modulate the breach-detection signals.

7. The tamper indicating device of claim 4, wherein the reflectometer identifies a particular one of the connector assemblies associated with the breach by detecting Fresnel reflection in the return breach-identification signals and determining a temporal relationship between the Fresnel reflection and the corresponding breach-identification signals.

8. The tamper indicating device of claim 4, wherein, for each connector assembly:
   the connector assembly is integrated into a bolt assembly;
   the bolt assembly secures a lid ring on a storage drum; and
   rotation of the bolt assembly to remove the lid ring causes a breach in the connector assembly.

9. The tamper indicating device of claim 8, further comprising an acetate film within the connector assembly that falls apart upon rotation of the bolt assembly causing the breach in the connector assembly.

10. A tamper indicating device, comprising:
    a plurality of fiber optic loops, each loop defining first and second ends, optically connecting a plurality of connector assemblies between the first and second ends, and comprising an optical transmitter for injecting breach-detection signals into the first end of the loop and a receiver for detecting corresponding return breach-detection signals at the second end of the loop;
    a control computer functionally connected to the transmitter and the receiver of each loop and, for each loop, the control computer is operative to generate trigger signals for causing the transmitter to inject the breach-detection signals into the first end of the loop, to receive indicator signals from the receiver in response to the breach-detection signals, and to detect a breach in the loop by comparing the trigger signals to the indicator signals;
    an optical time-domain reflectometer operative to generate optical breach-identification signals and to receive corresponding return breach-identification signals;
    a matrix router optically connected to the reflectometer and operative to selectively connect the reflectometer to each of the fiber optic loops, the matrix router functionally connected to the control computer, which is operative to cause the matrix router to switch the reflectometer into optical connection with a selected one of the fiber optic loops in response to detection of a breach in the selected loop; and
    the reflectometer is operative to interrogate the selected loop to identify a particular one of the connector assemblies associated with the breach by comparing breach-identification signals injected into the selected loop to corresponding return breach-identification signals.

11. The tamper indicating device of claim 10, wherein, for each connector assembly:
    the matrix router selectively connects the reflectometer to the first and second ends of each loop;
    the reflectometer is further operative to inject optical signals into both ends of the selected fiber optic loop to monitor the integrity of non-breached connector assemblies while the breach subsists in the selected fiber optic loop;
    each transmitter comprises a light-emitting diode; and
    each receiver comprises a photodiode.

12. The tamper indicating device of claim 11, wherein the control computer is operative to randomly pulse the breach-detection signals or frequency modulate the breach-detection signals.

13. The tamper indicating device of claim 12, wherein the reflectometer identifies a particular one of the connector assemblies associated with the breach by detecting Fresnel reflection in the return breach-identification signals and determining a temporal relationship between the Fresnel reflection and the corresponding breach-identification signals.

14. The tamper indicating device of claim 13, wherein, for each connector assembly:

the connector assembly is integrated into a bolt assembly;

the bolt assembly secures a lid ring on a storage drum; and rotation of the bolt assembly to remove the lid ring causes a breach in the connector assembly.

15. A method for optically detecting tampering, comprising the steps of:

providing a plurality of fiber optic loops, each loop optically connecting a plurality of connector assemblies within the loop;

for each loop, detecting a breach in the loop by comparing representations of optical signals injected into the loop to representations of return signals received from the loop;

in response to detecting a breach in a selected loop, injecting optical breach-identification signals to interrogate the selected loop to identify a particular one of the connector assemblies associated with the breach by injecting breach-identification signals into the selected loop and comparing the breach-identification signals to corresponding return breach-identification signals; and injecting optical signals into both ends of the selected fiber optic loop to monitor the integrity of non-breached connector assemblies while the breach subsists in the selected fiber optic loop.

16. The method of claim 15, further comprising the step of randomly pulsing the breach-detection signals.

17. The method of claim 15, further comprising the step of frequency modulate the breach-detection signals.

18. The method of claim 15, wherein the step of comparing the breach-identification signals to corresponding return breach-identification signals comprises the step of detecting Fresnel reflection in the return breach-identification signals and determining a temporal relationship between the Fresnel reflection and the corresponding breach-identification signals.

19. The method of claim 18, further comprising the steps of, for each connector assembly:

integrating the connector assembly into a bolt assembly in which rotation of the bolt assembly causes a breach in an optical path through the connector assembly;

securing a lid ring on a storage drum with bolt assembly; and monitoring the connector assembly for a breach.

20. The method of claim 19, further comprising the step of multiplexing the breach-detection signals among the loops.

* * * * *